United States Patent
Mansouri Rad et al.

(10) Patent No.: US 9,835,800 B2
(45) Date of Patent: Dec. 5, 2017

(54) POLARIZATION CONTROL FOR A PHOTONIC PLATFORM

(71) Applicants: Mohammad Mehdi Mansouri Rad, Ottawa (CA); Hamid Mehrvar, Ottawa (CA); Dominic John Goodwill, Ottawa (CA)

(72) Inventors: Mohammad Mehdi Mansouri Rad, Ottawa (CA); Hamid Mehrvar, Ottawa (CA); Dominic John Goodwill, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/067,798

(22) Filed: Mar. 11, 2016

(65) Prior Publication Data
US 2017/0261689 A1    Sep. 14, 2017

(51) Int. Cl.
| G02B 6/27 | (2006.01) |
| H04Q 11/00 | (2006.01) |
| G02B 6/293 | (2006.01) |
| G02F 1/225 | (2006.01) |
| G02F 1/21 | (2006.01) |

(52) U.S. Cl.
CPC ......... *G02B 6/2773* (2013.01); *G02B 6/2706* (2013.01); *G02B 6/2766* (2013.01); *G02B 6/29352* (2013.01); *G02F 1/225* (2013.01); *H04Q 11/0005* (2013.01); *G02F 2001/212* (2013.01); *H04Q 2011/0015* (2013.01)

(58) Field of Classification Search
CPC .. G02B 6/2773; G02B 6/2706; G02B 6/2766; G02B 6/29352; G02F 1/225; G02F 2001/212; H04Q 11/0005; H04Q 2011/0015; H04B 10/532; H04B 10/2569; H04B 10/2572; H04J 14/06
See application file for complete search history.

(56) References Cited

U.S. PATENT DOCUMENTS

| 6,373,617 B1 | 4/2002 | Boffi et al. |
| 2003/0067602 A1* | 4/2003 | Patel ............... G01J 3/447 356/369 |
| 2004/0109233 A1 | 6/2004 | Allard |
| 2004/0228567 A1 | 11/2004 | Martinelli et al. |

(Continued)

OTHER PUBLICATIONS

Möller, Lothar, "WDM Polarization Controller in PLC Technology," IEEE Photonics Technology Letters, vol. 13, No. 6, pp. 585-587, 2001.

(Continued)

*Primary Examiner* — Mohammad R Sedighian
(74) *Attorney, Agent, or Firm* — Gowling WLG (Canada) LLP (57) ABSTRACT

A state of polarization (SOP) controller allows a randomly polarized input beam to be converted to a single linear polarization, while transferring substantially all of the power to the output. The input beam is split into orthogonal components and one of the components rotated and a phase difference between the components compensated for. The phase aligned components may then be recombined into a single output. The phase shifters may be reset during a reset period during which the impact on data transmission is reduced.

20 Claims, 8 Drawing Sheets

(56) References Cited

U.S. PATENT DOCUMENTS

2015/0117872 A1* 4/2015 Lyubomirsky .......... H04J 14/06
398/205
2016/0238795 A1* 8/2016 Tan ...................... G02B 6/3546

OTHER PUBLICATIONS

Madsen, C. K., et al., "Reset-Free Integrated Polarization Controller Using Phase Shifters," IEEE Journal of Selected Topics in Quantum Electronics, vol. 11, No. 2, pp. 431-438, 2005.

Sacher, Wesley D., et al., "Polarization rotator-splitters and controllers in a Si3N4-on-SOI integrated photonics platform," Optics Express, pp. 11167-11174, 2014.

International Search Report of PCT/CN2016/109932 dated Mar. 8, 2017.

* cited by examiner

POLARIZATION CONTROL FOR A PHOTONIC PLATFORM

TECHNICAL FIELD

The current disclosure relates to polarization control and in particular to polarization control for photonic platform based components and modules.

BACKGROUND

Photonic platform based devices such as silicon photonic circuits typically require a particular state of polarization (SOP) of the incoming light, for example the transverse-electric (TE) SOP. However, in practice the incoming light may have a different SOP. Accordingly, only a portion of the incoming light may provide a usable signal to the silicon photonic component. The use of silicon photonics in datacenters may benefit from controlling the SOP of incoming light.

SUMMARY

In accordance with the present disclosure there is provided a state of polarization (SOP) controller comprising: an optical beam splitter for splitting a randomly polarized input beam into mutually orthogonal first and second polarization components; a polarization rotator disposed in an optical path of the second polarization component for providing a rotated second polarization component parallel to the first polarization component; a first variable phase shifter coupled to the optical beam splitter or the polarization rotator for reducing a phase difference between the first polarization component and the rotated second polarization component; an optical coupler for combining the first polarization component with the rotated second polarization component to provide an SOP controller output beam having a pre-determined SOP; and a reset controller configured for resetting the SOP controller during a reset period.

In a further embodiment of the SOP controller, the polarization rotator is coupled to the optical beam splitter. The polarization rotator and the optical beam splitter can also be a single polarizing beam splitter and rotator component.

In a further embodiment of the SOP controller, the first variable phase shifter is coupled to the optical beam splitter.

In a further embodiment, the SOP controller further comprises a second variable phase shifter coupled to the polarization rotator for shifting a phase of the rotated second polarization component.

In a further embodiment, the SOP controller further comprises a controller for controlling the first variable phase shifter and the second variable phase shifter if available, to reduce the phase difference between the first polarization component and the second rotated polarization component.

In a further embodiment of the SOP controller, the reset controller resets the SOP controller when a reset is required and an indication of the reset period is received.

In a further embodiment of the SOP controller, the indication of the reset period is an indication of an inter-frame gap received from a data layer controller.

In a further embodiment of the SOP controller, resetting the SOP controller comprises resetting the first variable phase shifter from providing a phase shift of $\pi+\alpha$ to provide a phase shift of $\alpha$.

In a further embodiment, the SOP controller further comprises a Mach-Zehnder Interferometer (MZI) based optical switch, wherein the MZI based optical switch comprises the optical coupler.

In a further embodiment of the SOP controller, the MZI based optical switch further comprises the first variable phase shifter.

In a further embodiment, the SOP controller further comprises a polarization measurement component for determining an SOP of the randomly polarized input beam to control the first variable phase shifter to reduce the phase difference between the first polarization component and the rotated second polarization component.

In accordance with the present disclosure there is provided a silicon-based photonic switch comprising: a plurality of input ports; a plurality of output ports; an optical switching fabric for coupling one or more of the plurality of input ports to one or more of the plurality of output ports; and a plurality of state of polarization (SOP) controllers, each associated with a respective one of the plurality of input ports and converting a random polarization of an incoming beam to a pre-determined linear polarization, each of the SOP controllers comprising: an optical beam splitter for splitting the incoming beam into a transverse-electric (TE) component and a transverse-magnetic (TM) component; a polarization rotator for rotating the TM component to provide a rotated TM component parallel to the TE component; a first variable phase shifter for lessening a phase difference between the TE and rotated TM components; an optical coupler for combining the TE and rotated TM components into a single output beam having the pre-determined polarization; and a reset controller for resetting the SOP controller during a reset period.

In a further embodiment, the silicon-based photonic switch further comprises a data layer controller for configuring the optical switching fabric and providing an indication of the reset period to each of the reset controllers.

In a further embodiment of the silicon-based photonic switch, the reset period comprises an inter-frame gap within transmitted data.

In a further embodiment of the silicon-based photonic switch, wherein each of the SOP controllers further comprises a controller for controlling the first variable phase shifter to reduce the phase difference between the TE and rotated TM components.

In accordance with the present disclosure there is provided a method of controlling a state of polarization (SOP) of incoming light, the method comprising: splitting the incoming light into first and second orthogonal polarization components; rotating the second polarization component to be parallel to the first polarization component; reducing a phase difference between the first and rotated second polarization components; combining the first and rotated second polarization components into an output beam having a pre-determined SOP; and resetting a phase shift used in reducing the phase difference during a reset period.

In a further embodiment, the method further comprises determining that the reset period has occurred; and providing a reset signal upon detection of the reset period if a reset is required.

In a further embodiment of the method, resetting the phase shift during the reset period comprises: determining that the reset is required based on the phase shift; receiving an indication of an inter-frame gap in transmitted data; and resetting the phase shift when it is determined that the reset is required and the indication of the inter-frame gap is received.

In a further embodiment, the method further comprises receiving the indication of the inter-frame gap in transmitted data from a data layer controller.

BRIEF DESCRIPTION OF THE DRAWINGS

Embodiments are described herein with references to the appended drawings, in which.

DETAILED DESCRIPTION

Datacenters may include one or more optical networks or optical portions of a larger network that include silicon-based photonic components. Generally, optical transceivers used in datacenters are non-coherent where the information is not coded in the polarization. Silicon photonic components, such as photonic switches, may operate optimally with a particular linear polarization of light, such as transverse-electric (TE) polarization. The silicon photonics may incur losses when operating with non-TE polarizations of incoming light. A state of polarization (SOP) controller that can convert a random polarization of incoming light to a linear polarization, such as TE polarization, for particular use in datacenter applications is described further herein. The SOP controller is able to convert the random polarization to the linear polarization and transfer the total power of the incoming signal to a single, linearly polarized beam. The SOP controller splits the incoming beam into orthogonal polarization components and transfers the power from one component to the other component. The SOP controller described further herein may use control signals from higher data control layers in order to provide a simple architecture that can be efficiently implemented in silicon. SOP controllers may be provided in a silicon photonic switch to control the SOP of incoming light and improve the performance of the optical component.

Figure 1:
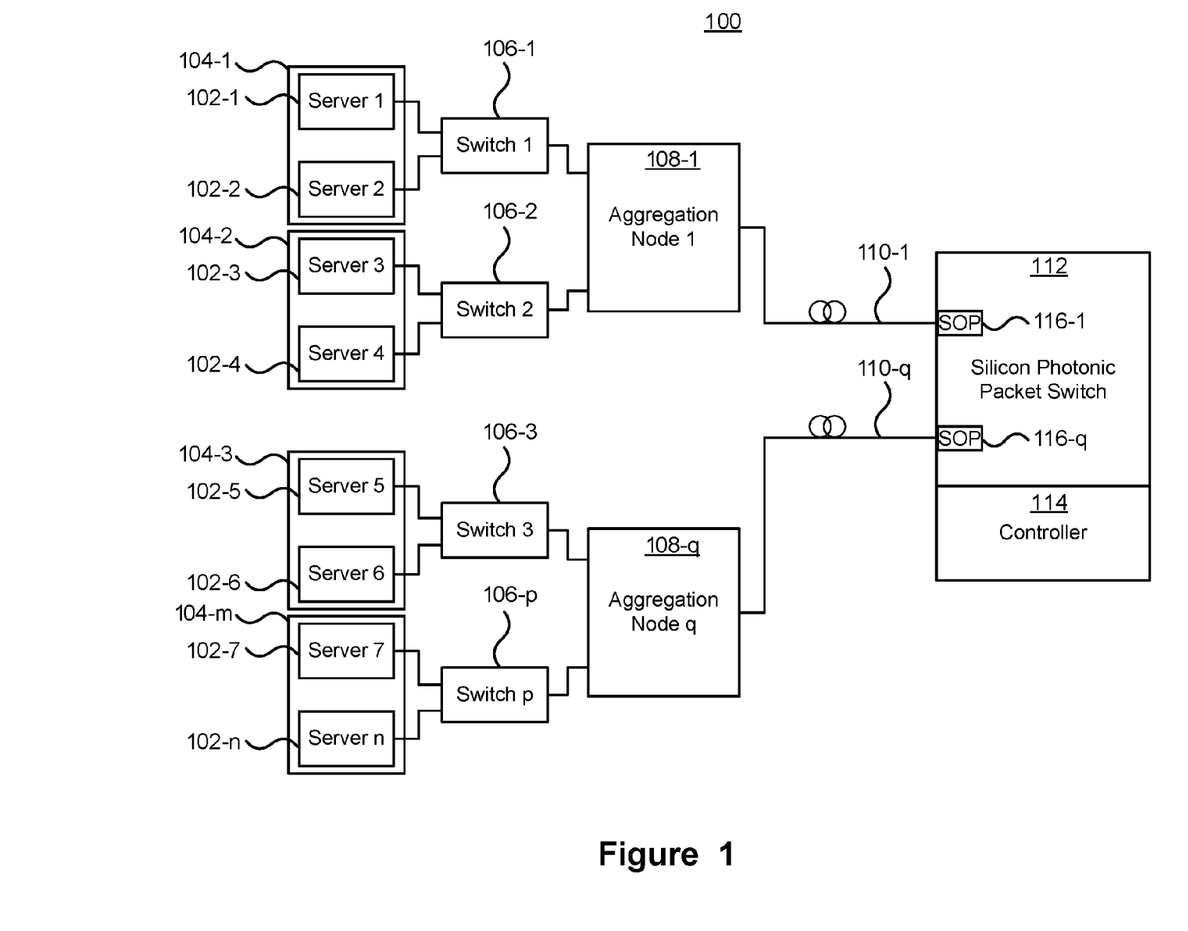
FIG. 1 depicts a schematic of a datacenter including an optical network portion.

FIG. 1 depicts a schematic of a datacenter including an optical network portion. It will be appreciated that the datacenter schematic 100 is only illustrative of a possible network hierarchy, and similar components may be deployed to provide different network architectures. The datacenter 100 comprises a number of servers 102-1-102-n (referred to collectively as servers 102) which may be arranged into a number of physical groups, cabinets or racks 104-1-104-m (referred to collectively as racks 104). Each of the racks 104 may be associated with one or more switches 106-1-106-p (referred to collectively as switches 106) for switching network traffic between the servers 102 connected to the same one of the switches 106, as well as other network locations.

A group of switches 106 may be connected to one or more aggregation nodes 108-1-108-q (referred to collectively as aggregation nodes 108). Although depicted as separate from the switches 106, one or more of the aggregation nodes 108 may be provided within the switches 106. The aggregation nodes 108 can aggregate a number of data packets from the switches 106 together into an optical frame and transmit the optical frame over optical cables 110-1-110-q (referred to collectively as optical cables 110). Similarly, the aggregation nodes 108 can separate the individual packets from a received optical frame and transmit the packets to the correct destination. A silicon photonic switch 112 is connected to the optical cables 110 of the aggregation nodes 108 and can switch the transmitted optical frames between different aggregation nodes 108, or other optical components. The silicon photonic switch 112 may comprise a controller 114 for controlling the optical switching between different ports. As depicted in FIG. 1, the silicon photonic switch 112 may include state of polarization (SOP) controllers 116-1-116-q (referred to collectively as SOP controllers 116) for converting the polarization of incoming light from the respective optical cables 110 to a linear polarization optimized for the silicon photonic switch 112.

The SOP controllers 116 of the photonic switches 112 in the datacenter 100 minimize, or at least reduce, polarization loss resulting from the silicon switch fabric's optimization for operation with one polarization, such as transverse-electric. As described in further detail below, the SOP controllers 116 convert the polarization in two stages. In the first stage, the randomly polarized light is split into two components, referred to as a transverse-electric (TE), $E_x$ or horizontal, component and a transverse-magnetic (TM), $E_y$, or vertical, component. Once split, the TM component is rotated to be parallel to the TE component and the phase difference between the two components is eliminated or at least reduced. In the second stage the phase corrected components are combined together into a single beam so that all, or at least most, of the optical power from the TE and rotated TM components are combined together into the single output beam. With the phase difference eliminated or reduced between the TE and rotated TM components, when the two components are re-combined the resulting beam will be linearly polarized and all, or substantially all, power from the incoming beam is transferred to the single polarization.

The SOP controllers 116 convert any incoming polarization to the desired SOP for the silicon photonic switch 112. In order to convert the polarization, the SOP of the incoming light may be measured and tracked at a sufficient speed to account for polarization drifts in the incoming light. If the SOP is not measured, the convergence and tracking speed of the SOP controllers 116 may be reduced. The amount of the polarization drift may be affected by a number of factors, including for example a length of the optical cables 110, temperature changes, pressure changes, applied stresses as well as other factors. In datacenter applications, the optical cables 110 may be relatively short, for example 2 km or less and located in a stable environment so that the temperature and pressures remain relatively constant. As such, the polarization drift in datacenter applications may be relatively small. Due to the relatively small polarization drift in datacenters, the SOP controllers 116 do not need to provide endless, or reset-free control.

In datacenters, a millisecond SOP change is likely to be a worst case scenario. Accordingly, SOP controllers 116 capable of being reset every millisecond or less may be sufficient to provide desirable performance even in worst case scenarios. In data transmissions in datacenters it is likely that every millisecond there will be a period of time when a reset may be performed without impacting the data transmission, or when the impact on data transmission resulting from the reset would be acceptable. For example, photonic frames are generally larger than packets, while not exceeding a few microseconds. Accordingly, if the SOP controllers 116 are able to be reset between photonic frames, it is not necessary to provide an endless, or reset-free controller. Since photonic switches, such as the silicon photonic switch 112, may be reconfigured before the start of transmitting photonic frames, the SOP controllers 116 can be reset, if necessary, during a gap time between transmission of photonic frames. Although the gap time between photonic frames is described as being a particularly suitable for performing a reset, resets may be performed during other reset periods when the reset has an acceptable impact on data transmission. The SOP controllers 116 may use higher level control information to identify the occurrence of reset periods, such as the gaps between transmitted frames, and use the identified reset period to perform an SOP reset when required.

As described, although the switch 112 may be reconfigured during an inter-frame gap time between transmission of photonic frames, other times may be used to reset the SOP controllers 116. It is to be noted however that resets occurring during a packet transmission may result in loss of the packet. For example, rather than performing the reset during an inter-frame gap time, the reset may be performed during transmission of low priority packets, or during transmissions capable of dealing with lost packets.

The SOP controllers 116 can provide fast and reliable SOP control at minimum, or at least low, insertion losses. The use of higher level data layer control signals in the SOP controller 116 provides a simple SOP controller that can be implemented on-chip with the silicon photonic switching fabric.

Figure 2:
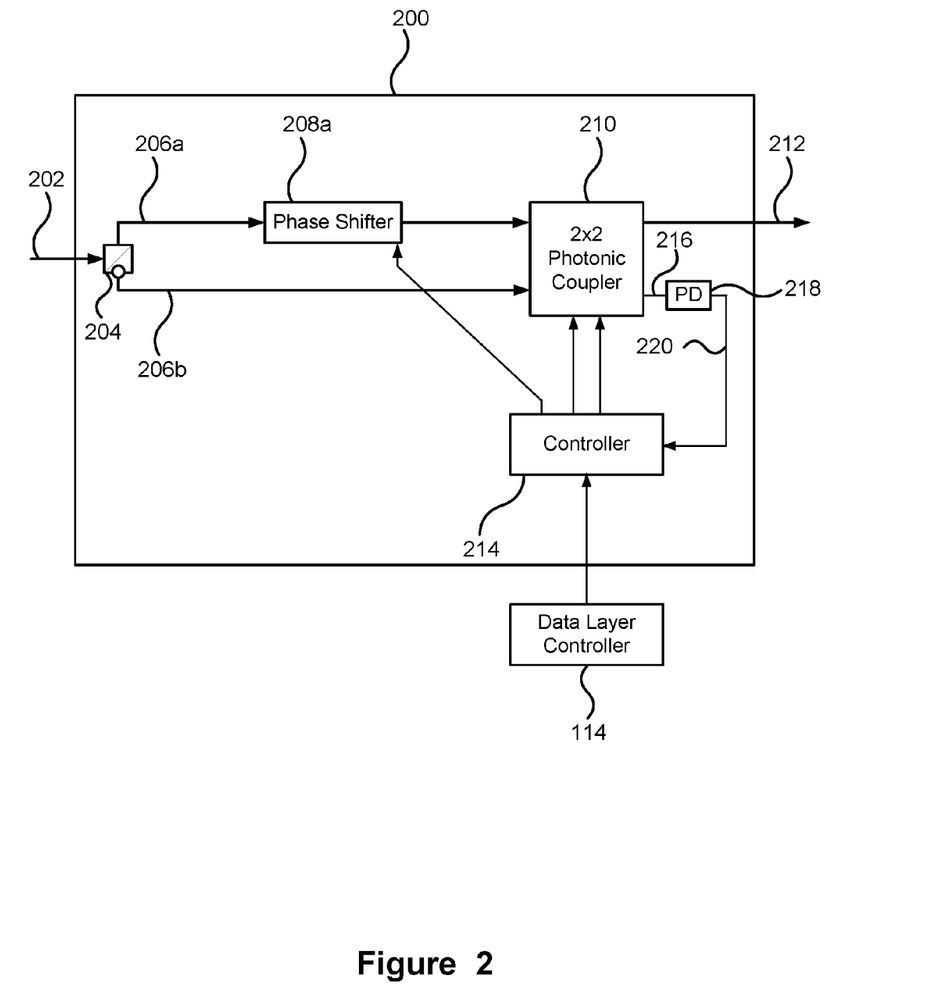
FIG. 2 depicts components of a state of polarization (SOP) controller for datacenter applications.

FIG. 2 depicts components of a state of polarization (SOP) controller 200 for use in various applications, such as for example datacenter applications. As depicted in FIG. 1, the photonic packet switch 112 may have a number of incoming ports 110-1-110-$q$ with an individual SOP controller 116-1-116-$q$ associated with each of the incoming ports to convert the random polarization of the incoming light prior to impinging on the switching fabric. A single SOP controller 200, which may be used as any of the SOP controllers 116, may include both optical components as well as electrical components. The SOP controller 200 may be formed on the same photonic chip as the photonic switching fabric, or may be formed on separate photonic chips that are optically coupled together.

The SOP controller 200 receives a randomly polarized input beam 202, which is provided to a polarizing beam splitter and rotator (PBSR) 204. The PBSR 204 splits the input beam 202 into a first component 206a and a second component 206b that is orthogonal to the first component. The first component 206a may be referred to as a TE component and may be considered as being horizontally polarized. The second component 206b may be referred to as a TM component and may be considered as being vertically polarized. In addition to splitting the incoming beam, the PBSR 204 rotates one of the components, depicted as the second component 206b, by 90° so that it is parallel with the other component. The rotated second component may be referred to as the rotated TM component or simply TM*. A phase difference between the TE and TM*, or TM, components may be eliminated or reduced by one or more variable phase shifters, such as phase shifter 208a. The SOP controller 200 comprises a controller 214 for controlling the various components. The variable phase shifter 208a, which is controlled by the controller 214, is used to eliminate or reduce the phase difference between the two polarization components. The phase-aligned components may be provided to a 2×2 photonic coupler 210 that combines the two components together into a single output 212 that has a linear polarization suitable for use with silicon photonic components, such as a TE component. The 2×2 photonic coupler 210 may be provided in various ways including, for example by a Mach-Zehnder Interferometer (MZI)-based switch structure, or other non-MZI-based switch structures. The phase shifter 208a may be external to the photonic coupler 210 or may be combined with the photonic coupler 210 if, for example, the photonic coupler 210 is provided by an MZI-based switch structure, or other non-MZI-based switch structure. For example, if the 2×2 photonic coupler 210 is provided by an MZI-based switch structure, the phase shifter 208a may be incorporated into an arm of the MZI switch structure. The SOP controller 200 allows almost or all of the power in a randomly polarized input beam to be transferred to a polarization suitable for use with silicon photonic components, which may be a TE polarization.

Although the PBSR 204 is depicted as a single component, the PBSR 204 may be provided by separate optical components. For example, a beam splitter may slit the input beam 202 into two polarization components and a rotator optically coupled to the beam splitter may rotate one of the polarization components. Further, the rotator may be arranged in an optical path between the beam splitter and the photonic coupler 210, between the beam splitter and the phase shifter 208a, or between the phase shifter and the photonic coupler 210. That is, if the rotator is provided separately from the beam splitter, it is located in an optical path downstream from the beam splitter and upstream of the photonic coupler 210.

As described above, the controller 214 may control the operation of the SOP controller components, including the variable phase shifter 208a as well as the 2×2 photonic coupler 210. The controller 214 may receive an indication of an amount of power in a secondary output 216 of the 2×2 photonic coupler 210. The power may be detected by a power detector such as a photo detector 218, which provides an electrical signal 220 to the controller that provides an indication of the amount of power in the signal at the second output 216. Various different control techniques may be provided by the controller 214 to control the phase shifters 208a and photonic coupler 210. Regardless of the specific control techniques employed, each control technique attempts to maximize the power from the input beam 202 that is transferred to the output beam 212. In order to maximize the power in the output beam 212, the power in the second output 216 of the photonic coupler 210 is minimized.

In controlling the phase shifter 208a, the controller 214 may require resetting the phase shift provided by the phase shifter 208a. For example if a phase shift of $2\pi+\alpha$ is required, the phase shifter may be reset to $\alpha$, which requires a finite amount of time to be completed. The polarization controller 214 performs the reset, when required, during a time at which the impact on transmitted data will be the smallest, or at least acceptable. Since the SOP is slowly varying, the controller 214 may delay when the reset occurs until a reset period occurs. As an example, when a photonic frame ends transmission, there may be a gap time during which the reset may be performed without any impact on the transmitted signals. A data layer controller 114 provided by the switch associated with the SOP controller 200 may provide an indication of the occurrence of reset periods during which the reset can be performed. For example, the reset period may be during an inter-frame gap, during transmission of a low-priority packet, or any other time during which a corrupted transmission, which could result in packet loss, is acceptable.

Figure 3:
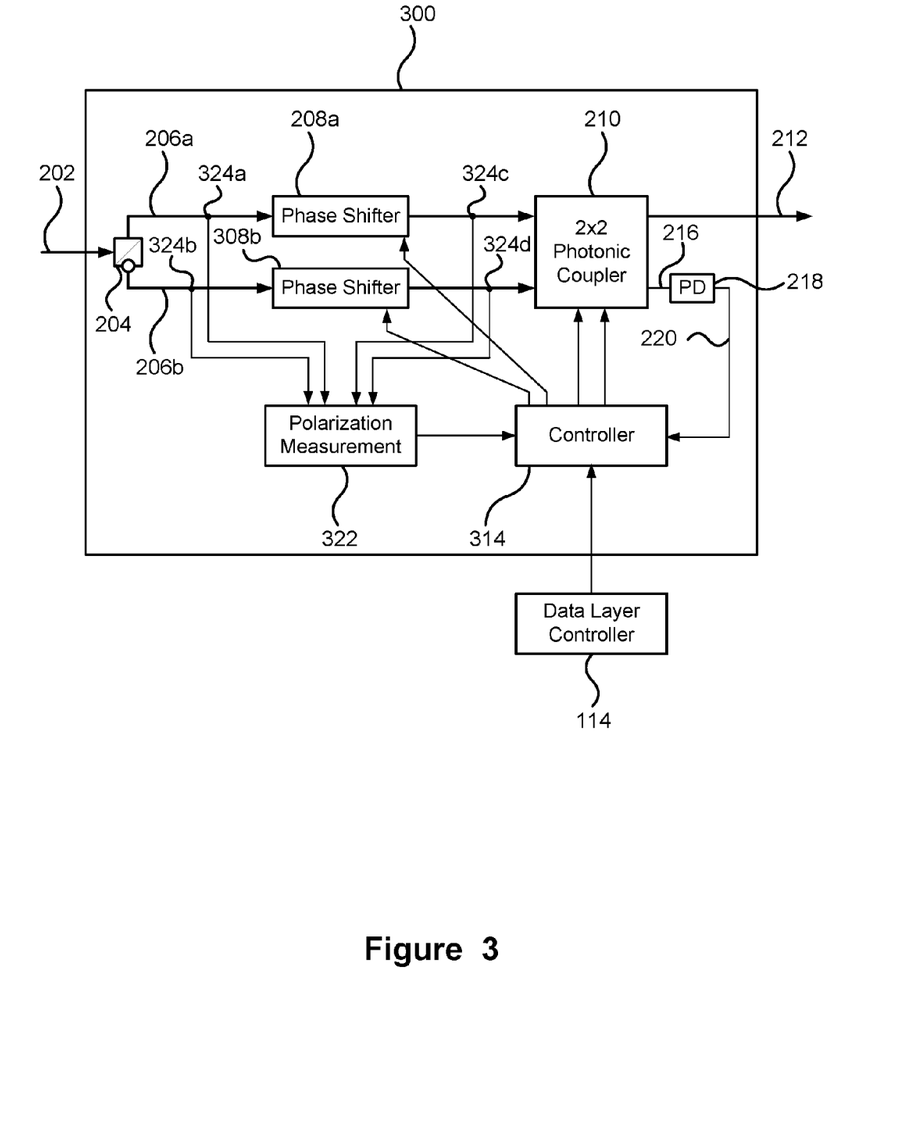
FIG. 3 depicts components of a further SOP controller for datacenter applications.

FIG. 3 depicts components of a further SOP controller 300 suitable for datacenter applications. The SOP controller 300 of FIG. 3 is similar in operation to the SOP controller 200 of FIG. 2; however, the SOP controller 300 of FIG. 3 includes a polarization measurement component 322, as well as an additional phase shifter 308b. Although a single phase shifter 208a may be used to eliminate the phase difference between the two polarization components, the additional phase shifter 308b provides greater flexibility in how the phase difference is eliminated, as well as possibly providing flexibility in when resets may be performed. The polarization measurement component 322 determines the SOP of the input light beam 202, which may be provided to a polarization controller 314 for use in controlling the phase shifters 208a, 308b and the 2×2 photonic coupler 210. The use of the SOP measurement allows the controller 314 to more quickly converge on transferring all of the power in the input beam 202 to the output 212. The polarization measurement component 322 may utilize one or more different optical signals. The optical signals may be provided from optical taps 324a, 324b, 324c, 324d (referred to collectively as optical taps 324). The polarization measurement component 322 may use one or more of the optical signals from the optical taps 324. As depicted, the polarization measurement component 322 may measure the SOP of a beam, or more particularly, between two components of the beam. By measuring the polarization between the TE and TM* components of the input beam 202 the polarization controller 314 can determine an amount of phase shift required to apply to the two polarization components in order to convert the random polarization to a linear polarization. As depicted, the polarization measurement component 322 may also measure the polarization between the phase-shifted TM* and TE components in order to provide real-time, or near real-time, feedback for correcting for polarization drift. That is, as the polarization drifts, the polarization of the phase-shifted TM* and TE components will vary from the desired linear polarization and the drift can be corrected by varying control of the phase shifters 208a, 308b. The controller 314 receives the measurements from the polarization measurement component 322 and determines the phase shifts required by the phase shifters. In particular, the controller 314 determines the phase shifter settings according to:

$$\begin{pmatrix} e^{j\phi_{upper}} & 0 \\ 0 & e^{j\phi_{lower}} \end{pmatrix} \begin{pmatrix} E_{x_0} e^{j\varphi_x} \\ E_{y_0} e^{j\varphi_y} \end{pmatrix} = e^{j\theta} \begin{pmatrix} E_{x_0} \\ E_{y_0} \end{pmatrix} \quad (1)$$

Where:
$e^{j\phi_{upper}}$ is the phase shift of the first phase shifter 208a in FIG. 3;
$e^{j\phi_{lower}}$ is the phase shift of the second phase shifter 308b in FIG. 3;
$E_{x_0} e^{j\varphi_x}$ is the first component;
$E_{y_0} e^{j\varphi_y}$ is the second component; and $$e^{j\theta} \begin{pmatrix} E_{x_0} \\ E_{y_0} \end{pmatrix}$$

is the combined phase-shifted first and second components.

The controller 314 also controls the photonic switch 210 in order to combine the phase shifted TM* and TE components into the output beam while minimizing the second output of the photonic switch 314. The polarization controller 314 controls the photonic switch 210 according to:

$$\begin{pmatrix} \cos\varphi & \sin\varphi \\ \cos\varphi & -\cos\varphi \end{pmatrix} \begin{pmatrix} E_x \\ E_y \end{pmatrix} = \begin{pmatrix} E_x^F \\ 0 \end{pmatrix} \quad (2)$$

Where:
$\phi$ is phase shift between first and second components provided by the phase shifter;
$E_x$ is the amplitude of the output of the first variable phase shifter;
$E_y$ is the amplitude of the output of the second variable phase shifter; and
$E_x^F$ is the linearly polarized output beam.

The controller 314 may monitor the power of the second output of the photonic coupler 210 using, for example, a photo detector 218, in order to adjust the phase shifters and switch to maintain the second output of the switch 216 at 0, which results in most or all of the power being transferred to the output beam 212.

As depicted in FIG. 3, the controller 314 may receive signals from a data layer controller 114. The data layer controller 114 may be a controller of the photonic packet switch 112 depicted in FIG. 1, and may provide an indication of when gaps between optical frames occurs. If a reset of the phase shifters 208a, 308b is required, it may occur during reset periods such as during the gaps between photonic frames or during other times that provide acceptable packet loss rates. For example, the reset may be performed during transmission of a low priority packet, or packet determined to be not important and as such capable of being corrupted and lost. Accordingly, by receiving the data from the packet switch, the SOP controller 300 is able to utilize a simpler architecture since the SOP controller 300 can perform resets at times that will not impact the data transmission.

Figure 4:
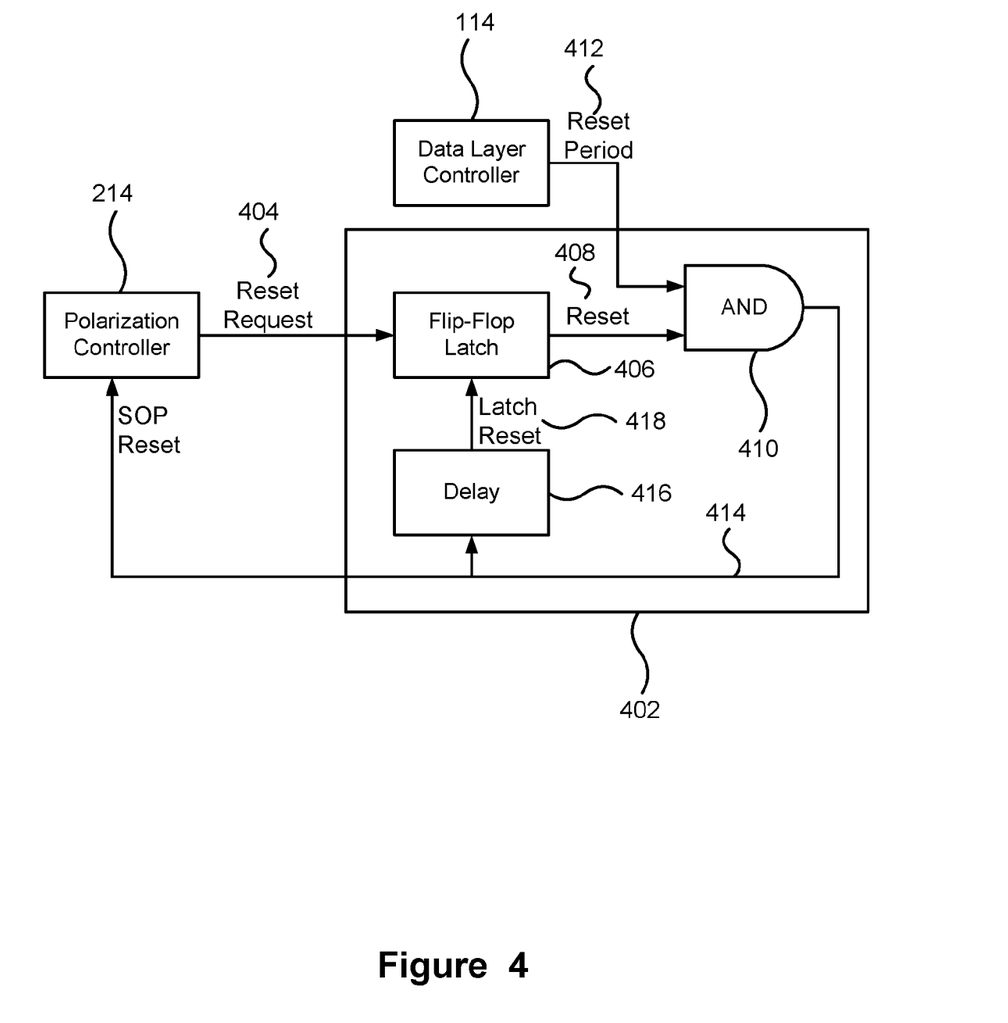
FIG. 4 depicts components of a reset controller for use with the polarization controller of FIG. 2.

FIG. 4 depicts components of a reset controller 402 for use with the controller of SOP controllers 200, 300 of FIG. 2 or 3. The controller 214 of FIG. 2 is depicted in FIG. 4. The controller 214 and the reset controller 402 are depicted as separate components; however, the reset controller 402 components may be incorporated into the controller 214. The controller 214 determines that a reset is required to be performed and sends a reset request 404 to the reset controller 402. A reset may required when the phase shift increases past $2\pi$, for example to $2\pi+\alpha$. The reset request is latched into a flip-flop 406 and output 408 to an AND circuit 410. The AND circuit performs an AND operation of the flip-flop output 408 and a signal 412 indicative of the occurrence of a reset period such as a gap between transmitted photonic frames. The signal 412 may be received from higher level controllers, not shown, of the switch. The reset period signal 412 is provided to the reset controller 402 from a data layer controller 114. The AND circuit provides an SOP reset signal 414 when the flip-flop has latched a reset request and a reset period has occurred. When the SOP reset signal 414 is generated, a delay component 416 can provide a delay before applying a latch reset signal 418 to the flip-flop latch in order to reset the flip-flop so that there is no pending reset request. The SOP reset signal 414 is received by the polarization controller 214 and used as an indication of when to perform the reset.

Figure 5:
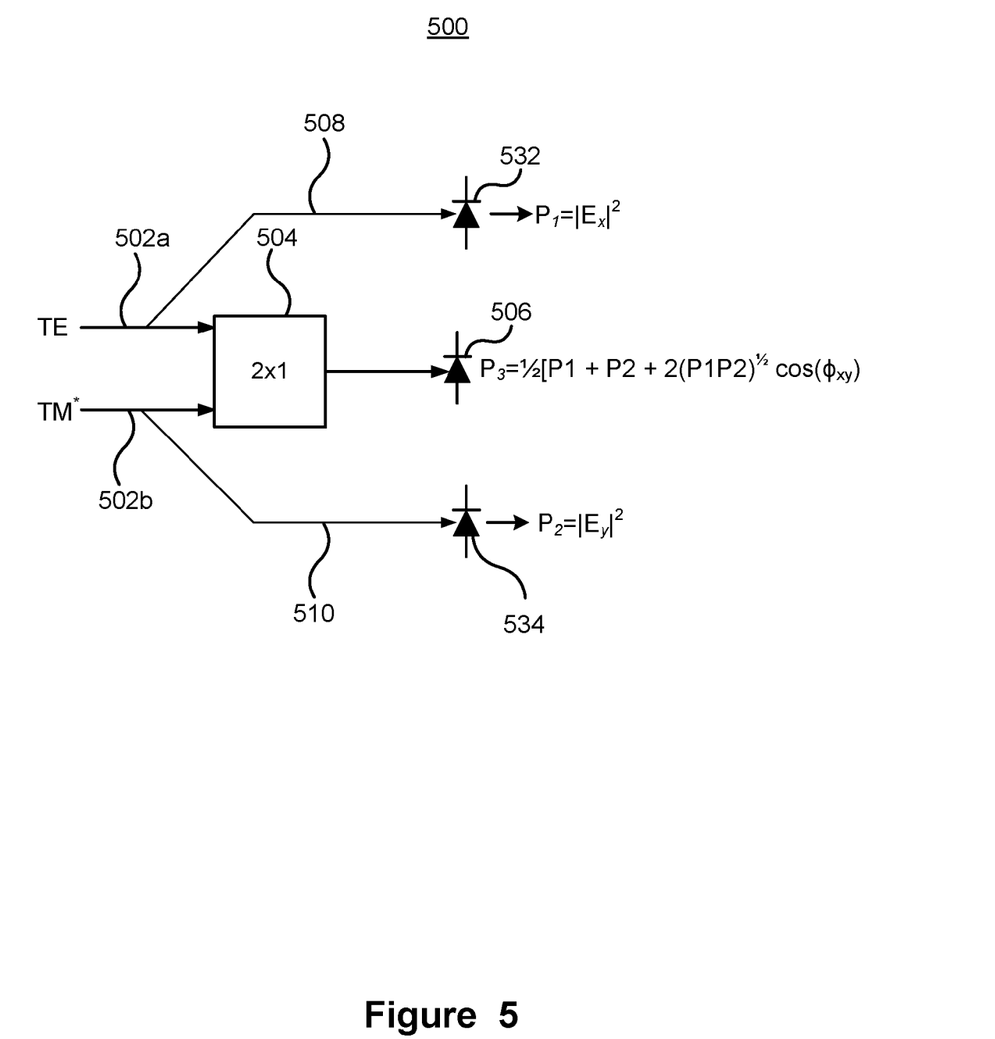
FIG. 5 depicts components of a polarization measurement component for use in the SOP controller of FIG. 3.

FIG. 5 depicts components of a polarization measurement component 500 for use in the SOP controller 200 of FIG. 2. The polarization measurement component 500 measures a resultant polarization of two polarization components, depicted as the TM* component 502b, which may be the rotated TM component, and the TE component 502a. The TM* component 502b and TE component 502a may be provided by taps 324a, 324b off the inputs to the phase shifters 208a, 208b of the SOP controller 300 depicted in FIG. 3, or by taps 324c, 324d of the outputs of the phase shifters 208a, 308b of the SOP controller 300. Providing measurements before and after the phase shifters may provide quicker convergence as well as eliminating any phase offset introduced by the phase shifters.

The polarization measurement may utilize only the input measurements or output measurements; however, the convergence speed may be lower. The different taps 324a-324d before and after the phase shifters 208a, 308b may be selectively coupled to the measurement component 500 through a pair of multiplexers or switches that can selectively couple one of the two components from before or after a phase shifter to the measurement components. Alternatively, the measurement components may be duplicated in order to provide polarization measurements of the TM* and TE components before the phase shifters 208a 308b in FIG. 3 and between the phase shifted TM* and TE components after the phase shifters 208a 308b.

The polarization measurement component 500 determines an SOP between a TE component 502a and a TM* component 502b. The TE and TM* components may be split into different optical paths, one of which is provided to a 2×1 combiner 504, whose output is provided to a photo detector 506. The other split optical paths 508, 510 are provided to respective photo detectors 532, 534. As depicted, the photo detector 532 may provide a first power indication P1, the photo detector 534 may provide a second power indication P2 and the photo detector 506 may provide a third power indication P3. The phase difference between the two components, TE and TM*, may be determined according to the following equations:

$$P1=|E_x|^2 \quad (3)$$

$$P2=|E_y|^2 \quad (4)$$

$$P3=\frac{1}{2}[P1+P2+2\sqrt{P1P2}\cos(\phi_{xy})] \quad (5)$$

Where:
$E_x$ is an amplitude of the first component;
$E_y$ is an amplitude of the second component; and
$\phi_{xy}$ is the phase difference between the two components.

Equation (5) above can be re-arranged to provide the phase difference $\phi_{xy}$ based on the three measurements P1, P2, P3 provided by the respective photo detectors 532, 534, 506.

Figure 6:
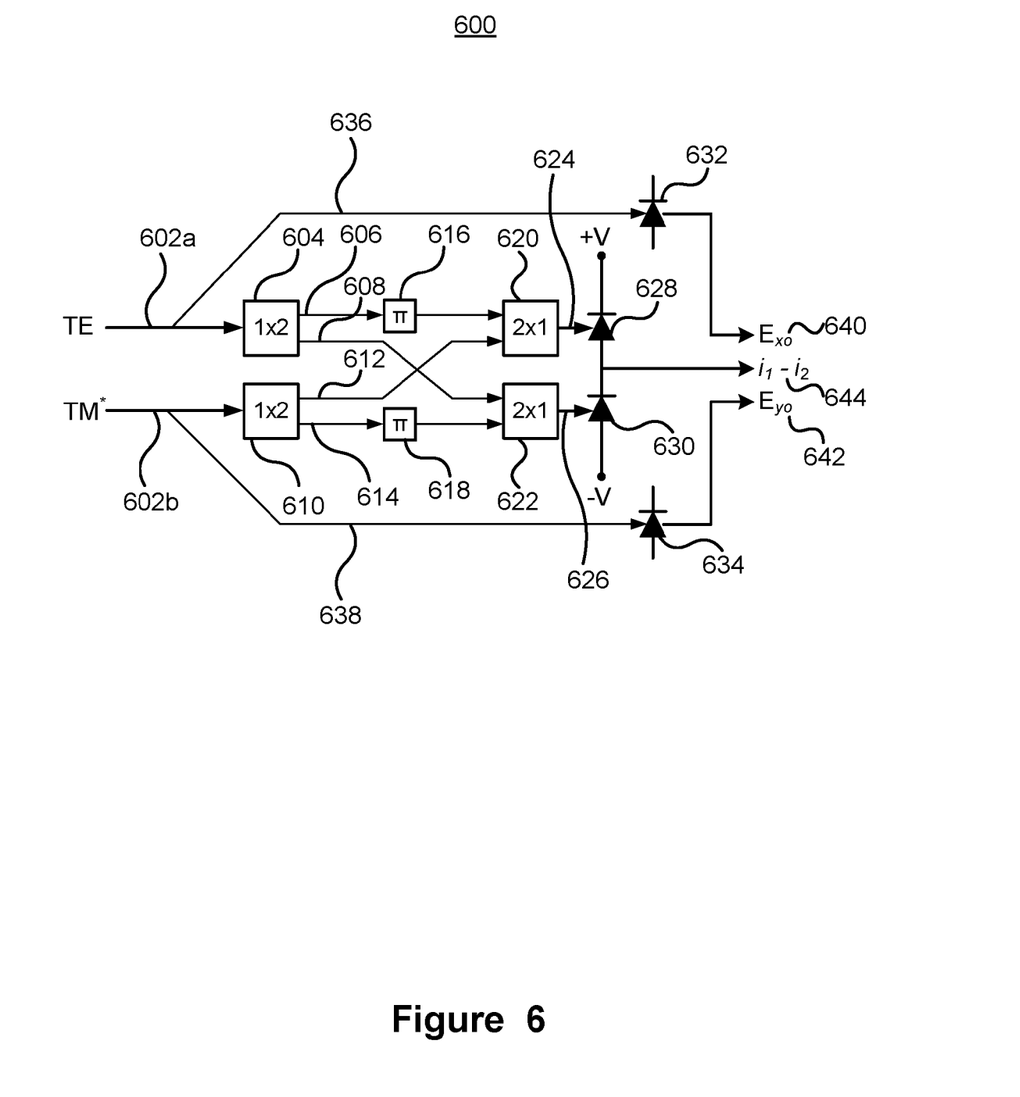
FIG. 6 depicts components of a further polarization measurement component for use in the SOP controller of FIG. 3.

FIG. 6 depicts components of a further polarization measurement component 600 for use in the SOP controller of FIG. 3. The measurement component 600 comprises a first 50/50 optical splitter 604 which splits the input beam of a TE 602a component into two equal beams 606, 608. A second 50/50 optical splitter 610 splits the input beam of a TM* component 602b into two equal beams 612, 614. One of the beams 606 from the first splitter 604 passes through a fixed phase shifter 616 that shifts the phase of the split signal 606 by π, or 180° degrees. Similarly, one of the beams 614 from the second splitter 610 passes through a fixed phase shifter 618 that shifts the phase of the split signal 614 by π, or 180° degrees. The phase shifted outputs are then combined with the un-shifted outputs of the opposite splitter. As depicted, a first combiner 620 combines the output from the first fixed phase shifter 616 with the un-shifted output 612 from the second splitter 610. Similarly, a second combiner 622 combines the output from the second fixed phase shifter 618 with the output from the first splitter 604. The outputs 624, 626 from the respective combiners 620, 622 are detected by a pair of photo detectors 628, 630. The electrical signal at the node between the two photo detectors 628, 630 is proportional to the difference between the two output signals. It is noted that the two output signals that are compared are the 180° degree phase shifted TM* component combined with an un-shifted TE component and the 180° degree phase shifted TE component combined with an un-shifted TM* component. The polarization measurement component further includes a pair of photo detectors 632, 634 that detect an intensity of the TM* component, or more particular a tap of the TM* component 636, and the TE component, or more particularly a tap of the TE component 638. The outputs of the intensity photo detectors 632, 634 may each be detected or measured by circuitry (not shown), which may be made from, for example CMOS technologies, and represent the amplitude of the TM* component ($E_{x0}$ 640) and the amplitude of the TE component ($E_{y0}$ 642). Additionally, the signal 644 proportional to the difference signal between the two combiners 624, 626 can be detected or measured by circuitry. Based on the three measurements 640, 642, 644 the SOP of the signal being measured can be fully determined.

Figure 7:
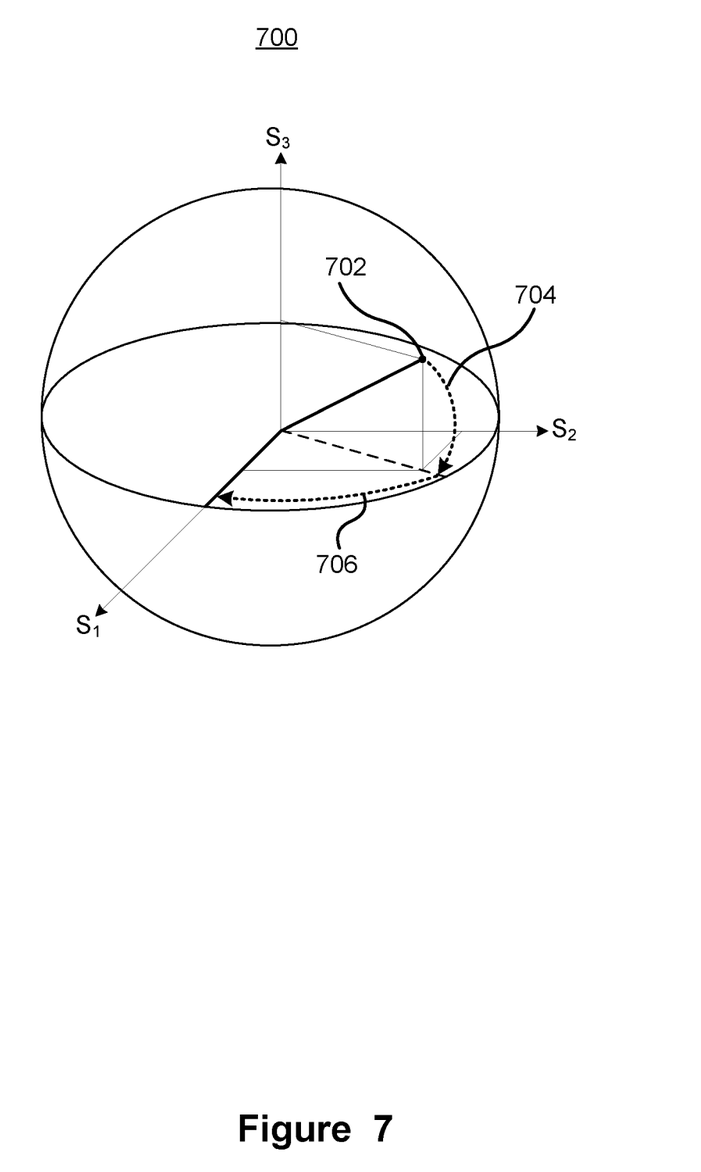
FIG. 7 depicts a Poincaré sphere representation of the SOP control.

FIG. 7 depicts a Poincaré sphere representation 700 of the SOP control. Different states of polarization can be represented on the Poincaré sphere representation 700. For example, a point 702 may represent an elliptical SOP. The result of the two-stage polarization control is represented graphically in FIG. 5. In the first stage, represented by arrow 704, the random polarization, which in FIG. 5 is elliptical, is converted to a linear polarization. The second stage, represented by arrow 706, transfers all of the power of the linear polarization to the desired polarization, which in FIG. 6 is depicted as a point on S1 axis.

Figure 8:
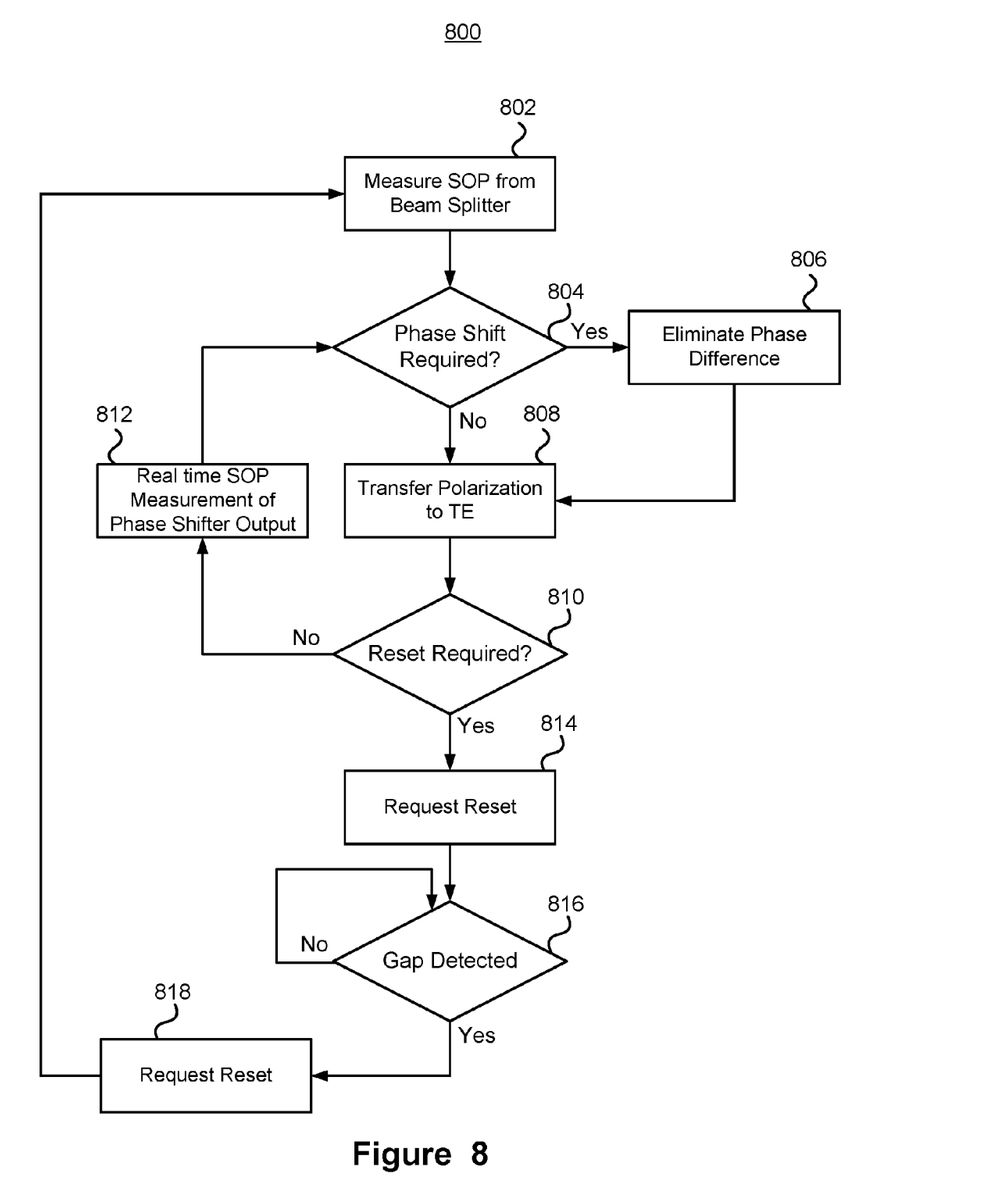
FIG. 8 depicts a method of SOP control.

FIG. 8 depicts a method 800 of SOP control. The method 800 begins with initially measuring the SOP from the beam splitter at a step 802. As described above, the measurement may determine the amplitude of the TM and TE components of the polarized beam as well as a phase shift between the two components. The method determines if a phase shift is required at a step 804, which is required if there is a phase difference between the TM and TE components, or if the phase difference between the two components is greater than an allowable threshold. If a phase shift is required (Yes at step 804), the method eliminates the phase difference at a step 806 between the TM and TE components. The phase difference is eliminated by adjusting the control of variable phase shifters associated with the TM and TE components. With the phase difference eliminated, or if no phase shift is required (No at step 804), the polarization is transferred to the TE polarization at a step 808. The TM and TE components, with the phase difference eliminated, are combined together into a single output having the desired polarization using a 2×2 photonic coupler, which may be provided by an MZI switch structure.

As described above, the polarization may drift from the initially measured SOP. Depending upon an amount of drift, it may be necessary to reset the SOP controller. The method determines if a reset is required at a step 810. If the reset is not required (No at step 810) real-time SOP measurements of the phase shifter output is performed at a step 812 and again it is determined if a phase shift is required at the step

804. The phase shift may be required based on the real-time measurements as a result of polarization drift. If it is determined that a reset is required (Yes at step 810), a reset is requested at a step 814. A reset may be required if the phase shift required to eliminate the phase difference is greater than what can be provided by the variable phase shifter. For example, as a phase shifter approaches $2\pi$, and additional phase shift of $\alpha$ is required resulting in a phase shift of $2\pi+\alpha$, the phase shifter may be reset to provide a phase shift of $\alpha$. As described previously, once a reset is requested, the actual reset may occur at the next occurrence of the next gap between transmitted optical frames. The method 800 may determine if a gap was detected at a step 816, for example based on control signals received from higher layers of the switch fabric. If no gap was detected (No at step 816) the method continues to wait until a gap is detected. If a gap was detected (Yes at step 816), the SOP controller is reset at a step 818 and the SOP from the beam splitter is measured at the step 802.

The method 800 described above allows any polarization of incoming light to be converted to a desired linear polarization, such as the TE polarization. The method eliminates a measured phase difference between TM and TE components of the incoming light and then transfers all of the power of the incoming beam to the TE polarization, which the silicon photonic components operate efficiently with.

The present disclosure provided, for the purposes of explanation, numerous specific embodiments, implementations, examples and details in order to provide a thorough understanding of the invention. It is apparent, however, that the embodiments may be practiced without all of the specific details or with an equivalent arrangement. In other instances, some well-known structures and devices are shown in block diagram form, or omitted, in order to avoid unnecessarily obscuring the embodiments of the invention. The description should in no way be limited to the illustrative implementations, drawings, and techniques illustrated, including the exemplary designs and implementations illustrated and described herein, but may be modified within the scope of the appended claims along with their full scope of equivalents.

While several embodiments have been provided in the present disclosure, it should be understood that the disclosed systems and components might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

What is claimed is:

1. A state of polarization (SOP) controller comprising:
   an optical beam splitter for splitting a randomly polarized input beam into mutually orthogonal first and second polarization components;
   a polarization rotator disposed in an optical path of the second polarization component for providing a rotated second polarization component parallel to the first polarization component;
   a first variable phase shifter coupled to the optical beam splitter or the polarization rotator for shifting a phase difference between the first polarization component and the rotated second polarization component;
   an optical coupler for combining the first polarization component with the rotated second polarization component to provide an SOP controller output beam having a pre-determined SOP; and
   a reset controller configured for resetting the SOP controller during a reset period when an indication of the reset period is received.

2. The SOP controller of claim 1, wherein the polarization rotator is coupled to the optical beam splitter.

3. The SOP controller of claim 1, wherein the polarization rotator and the optical beam splitter are a single polarizing beam splitter and rotator component.

4. The SOP controller of claim 2, wherein the first variable phase shifter is coupled to the optical beam splitter.

5. The SOP controller of claim 3, further comprising:
   a second variable phase shifter coupled to the polarization rotator for shifting a phase of the rotated second polarization component.

6. The SOP controller of claim 1, further comprising a controller for controlling the first variable phase shifter to reduce the phase difference between the first polarization component and the second rotated polarization component.

7. The SOP controller of claim 1, wherein the indication of the reset period is an indication of an inter-frame gap received from a data layer controller.

8. The SOP controller of claim 1, wherein resetting the SOP controller comprises resetting the first variable phase shifter from providing a phase shift of $\pi+\alpha$ to provide a phase shift of $\alpha$.

9. The SOP controller of claim 1, further comprising a Mach-Zehnder Interferometer (MZI) based optical switch, wherein the MZI based optical switch comprises the optical coupler.

10. The SOP controller of claim 9, wherein the MZI based optical switch further comprises the first variable phase shifter.

11. The SOP controller of claim 1, further comprising a polarization measurement component for determining an SOP of the randomly polarized input beam to control the first variable phase shifter to reduce the phase difference between the first polarization component and the rotated second polarization component.

12. A silicon-based photonic switch comprising:
   a plurality of input ports;
   a plurality of output ports;
   an optical switching fabric for coupling one or more of the plurality of input ports to one or more of the plurality of output ports; and
   a plurality of state of polarization (SOP) controllers, each associated with a respective one of the plurality of input ports and converting a random polarization of an incoming beam to a pre-determined linear polarization, each of the SOP controllers comprising:
      an optical beam splitter for splitting the incoming beam into a transverse-electric (TE) component and a transverse-magnetic (TM) component;
      a polarization rotator for rotating the TM component to provide a rotated TM component parallel to the TE component;
      a first variable phase shifter for lessening a phase difference between the TE and rotated TM components;
      an optical coupler for combining the TE and rotated TM components into a single output beam having the pre-determined polarization; and
      a reset controller for resetting the SOP controller during a reset period.

13. The silicon-based photonic switch of claim 12, further comprising:

a data layer controller for configuring the optical switching fabric and providing an indication of the reset period to each of the reset controllers.

14. The silicon-based photonic switch of claim 13, wherein the reset period comprises an inter-frame gap within transmitted data.

15. The silicon-based photonic switch of claim 12, wherein each of the SOP controllers further comprises a controller for controlling the first variable phase shifter to reduce the phase difference between the TE and rotated TM components.

16. A method of controlling a state of polarization (SOP) of incoming light, the method comprising:
   splitting the incoming light into first and second orthogonal polarization components;
   rotating the second polarization component to be parallel to the first polarization component;
   shifting a phase difference between the first and rotated second polarization components;
   combining the first and rotated second polarization components into an output beam having a pre-determined SOP; and
   determining that a reset period has occurred; and
   resetting a phase shift used in reducing the phase difference during the reset period.

17. The method of claim 16, wherein resetting the phase shift during the reset period comprises:
   determining that the reset is required based on the phase shift;
   receiving an indication of an inter-frame gap in transmitted data; and
   resetting the phase shift when it is determined that the reset is required and the indication of the inter-frame gap is received.

18. The method of claim 17, further comprising receiving the indication of the inter-frame gap in transmitted data from a data layer controller.

19. The SOP controller of claim 1, wherein the indication of the reset period is received when a phase difference between the first and second polarization components is greater than a threshold.

20. The method of claim 16, wherein the resetting is performed when a phase difference between the first and second polarization components is greater than a threshold.

* * * * *